(12) United States Patent
Levesque et al.

(10) Patent No.: US 9,756,604 B1
(45) Date of Patent: Sep. 5, 2017

(54) HAPTIC FUNCTIONALITY FOR NETWORK CONNECTED DEVICES

(71) Applicant: Immersion Corporation, San Jose, CA (US)

(72) Inventors: Vincent Levesque, Montreal (CA); Abraham Alexander Dauhajre, Coral Springs, FL (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/215,935

(22) Filed: Jul. 21, 2016

(51) Int. Cl.
| | |
|---|---|
| *H04W 4/14* | (2009.01) |
| *H04W 68/00* | (2009.01) |
| *H04W 60/00* | (2009.01) |
| *H04W 4/02* | (2009.01) |
| *G08B 6/00* | (2006.01) |

(52) U.S. Cl.
CPC ............ *H04W 68/005* (2013.01); *G08B 6/00* (2013.01); *H04W 4/023* (2013.01); *H04W 60/005* (2013.01)

(58) Field of Classification Search
CPC ... H04W 28/20; H04W 16/14; H04W 76/025; H04W 12/06; H04W 4/008; H04W 4/001; H04L 61/6022; H04M 1/7253; H04M 1/72525; G06F 3/0482; G06F 3/0485; G06F 3/0412; G06F 3/016; G08B 6/00

USPC ............ 455/41.3, 456.3; 340/539.13, 573.4; 345/156; 709/202
See application file for complete search history.

(56) References Cited

U.S. PATENT DOCUMENTS

| | | | |
|---|---|---|---|
| 2014/0218184 A1 | 8/2014 | Grant et al. | |
| 2015/0123775 A1* | 5/2015 | Kerdemelidis | G08B 6/00 340/407.1 |
| 2015/0347075 A1 | 12/2015 | Levesque et al. | |
| 2016/0095017 A1* | 3/2016 | Ely | H04L 61/6022 455/454 |
| 2016/0134737 A1* | 5/2016 | Pulletikurty | G06F 3/0227 715/735 |

OTHER PUBLICATIONS

Vincent Levesque et al., U.S. Appl. No. 14/577,461, filed Dec. 19, 2014.
Vincent Levesque et al., U.S. Appl. No. 14/577,565, filed Dec. 19, 2014.
U.S. Appl. No. 15/176,692, filed Jun. 8, 2016.

* cited by examiner

*Primary Examiner* — Phuoc H Doan
(74) *Attorney, Agent, or Firm* — Miles & Stockbridge P.C.

(57) ABSTRACT

A system provides haptic functionality over a networked system. The system receives information from a first device registered at the networked system and determines a notification to be provided to a user based on the information. The system then selects a second device registered at the networked system and provides the notification to the user by producing a haptic effect on the second device.

20 Claims, 9 Drawing Sheets

US 9,756,604 B1

HAPTIC FUNCTIONALITY FOR NETWORK CONNECTED DEVICES

FIELD

One embodiment is directed generally to a haptic system, and in particular, to a system that implements a network for providing haptic functionality.

BACKGROUND INFORMATION

"Haptics" relates to a tactile and force feedback technology that takes advantage of the sense of touch of a user by applying haptic feedback effects (i.e., "haptic effects"), such as forces, vibrations, and motions, to the user. Devices, such as mobile devices, touchscreen devices, and personal computers, can be configured to generate haptic effects. In general, calls to embedded hardware capable of generating haptic effects (such as actuators) can be programmed within an operating system ("OS") of the device. These calls specify which haptic effect to play. For example, when a user interacts with the device using, for example, a button, touchscreen, lever, joystick, wheel, or some other control, the OS of the device can send a play command through control circuitry to the embedded hardware. The embedded hardware then produces the appropriate haptic effect.

SUMMARY

One embodiment is a system that provides haptic functionality over a networked system. The system receives information from a first device registered at the networked system and determines a notification to be provided to a user based on the information. The system then selects a second device registered at the networked system and provides the notification to the user by producing a haptic effect on the second device.

DETAILED DESCRIPTION

One embodiment provides haptic functionality for network connected devices such as objects in the Internet of Things ("IoT"). In one embodiment, one or more haptically enabled devices in a networked system are opportunistically selected and used to provide haptic effects to a user. In an alternative or additional embodiment, information collected from one or more networked devices are used to provide haptic effects to a user. The haptic effects may be associated with a message, a service, or an alert that needs to be provided to the user. Accordingly, by selecting and using various network connected devices, embodiments allow for better utilization of such devices in providing haptic functionality to a user.

Figure 1:
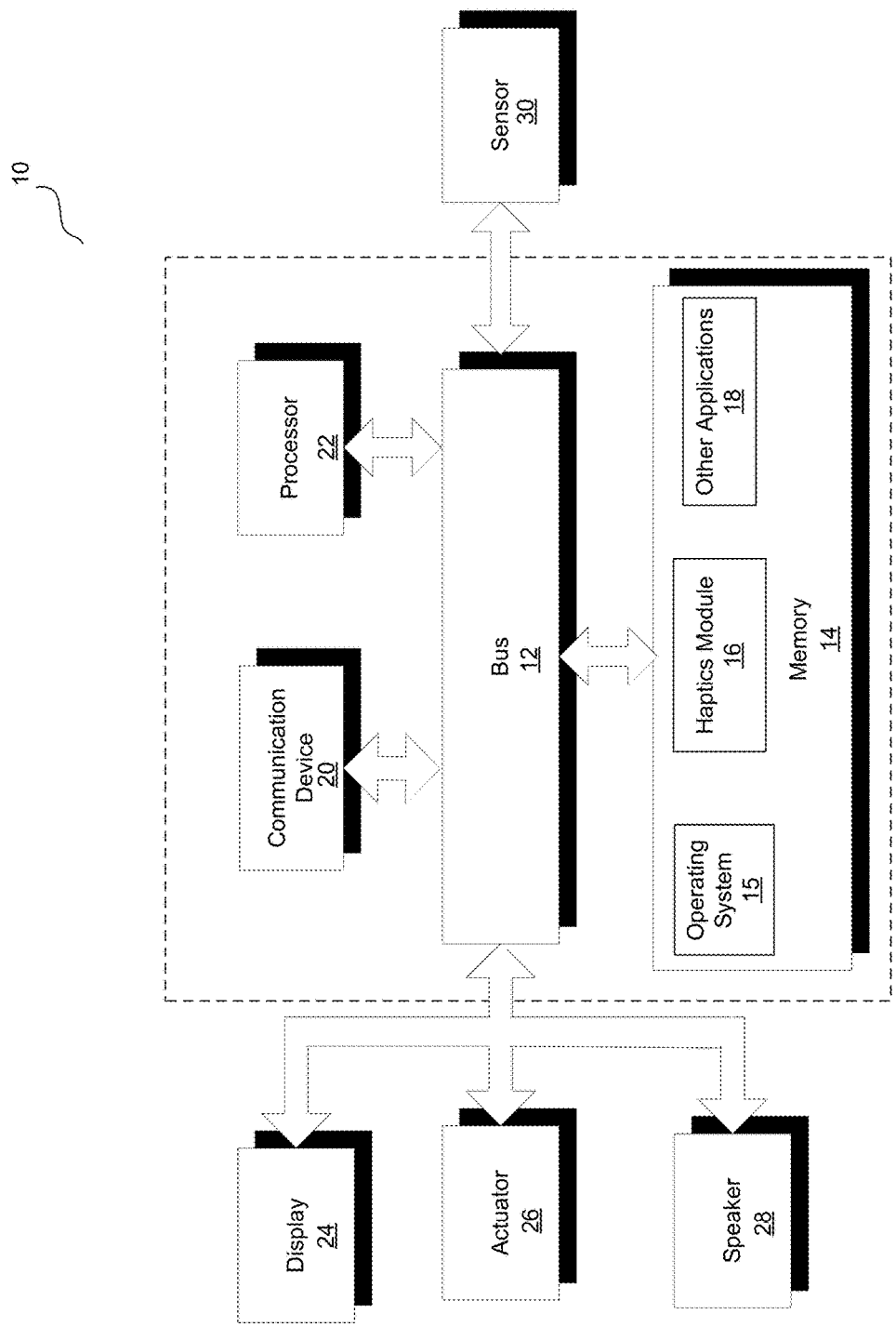
FIG. 1 is a block diagram of a computer server/system in accordance with an embodiment of the present invention.

FIG. 1 illustrates a block diagram of a system 10 in accordance with one embodiment of the invention. In one embodiment, system 10 is part of a mobile device (e.g., a smartphone) or a non-mobile device, and system 10 provides haptic functionality for the device. In another embodiment, system 10 is part of a device that is incorporated into an object in contact with a user in any way (e.g., furniture), and system 10 provides haptic functionality for such a device. For example, in one embodiment, system 10 is part of a wearable device, and system 10 provides haptic functionality for the wearable device. Examples of wearable devices include wrist bands, headbands, eyeglasses, rings, leg bands, arrays integrated into clothing, or any other type of device that a user may wear on a body or can be held by a user. Some wearable devices can be "haptically enabled," meaning they include mechanisms to generate haptic effects. In another embodiment, system 10 is separate from the device (e.g., a mobile device or a wearable device), and remotely provides haptic functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of transitory or non-transitory computer-readable medium.

A computer-readable medium may be any available medium that can be accessed by processor 22 and may include both a volatile and nonvolatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a mobile device in one embodiment. The modules further include a haptics module 16 that provides haptic functionality, as disclosed in more detail herein. In certain embodiments, haptics module 16 may comprise a plurality of modules, where each module provides specific individual functionality for providing haptic effects. System 10 typically includes one or more additional application modules 18 to include additional functionality, such as TouchSense™ software by Immersion Corp.

System 10, in embodiments that transmit and/or receive data from remote sources, further includes a communication device 20, such as a network interface card, to provide mobile wireless network communication, such as infrared, radio, Wi-Fi, cellular network communication, etc. In other embodiments, communication device 20 provides a wired network connection, such as an Ethernet connection, a modem, etc.

Processor 22 is further coupled via bus 12 to a display 24, such as a Liquid Crystal Display ("LCD"), for displaying a graphical representation or user interface ("UI") to a user. The display 24 may be a touch-sensitive input device, such as a touch screen, configured to send and receive signals from processor 22, and may be a multi-touch touch screen.

System 10, in one embodiment, further includes an actuator 26. Processor 22 may transmit a haptic signal associated with a haptic effect to actuator 26, which in turn outputs haptic effects such as vibrotactile haptic effects, electrostatic friction haptic effects, deformation haptic effects, etc. Actuator 26 includes an actuator drive circuit. Actuator 26 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, etc. In alternate embodiments, system 10 may include one or more additional actuators, in addition to actuator 26 (not illustrated in FIG. 1). Alternatively or additionally, actuator 26 may operate according to any other haptic technology such as thermal displays (e.g., hot/cold), electrotactile stimulation (i.e., stimulation of tactile receptors with electric current), kinesthetic feedback, etc. Yet another alternative or additional embodiment may implement electrical muscle stimulations such as a task that requires a user to determine what movement or movements the system is making them do and/or making them feel like doing.

Actuator 26 is an example of a haptic output device, where a haptic output device is a device configured to output any form of haptic effects, such as vibrotactile haptic effects, electrostatic friction haptic effects, deformation haptic effects, etc., in response to a drive signal. Accordingly, in alternate embodiments, actuator 26 may be replaced by some other type of haptic output device (not shown) that may be a non-mechanical or a non-vibratory device such as a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

For example, one embodiment provides a laser-based projectile where laser energy ionizes air molecules in a concentrated region mid-air to provide plasma (a concentrated mixture of positive and negative particles). In one embodiment, the laser may be a femtosecond laser that emits pulses at very fast and very intense paces, and the faster the laser, the safer for humans to touch. The projectile may appear as a hologram that is haptic and interactive. When the plasma comes in contact with user skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to such concentrated region. Alternatively or additionally, haptic effects may be provided to the user by subjecting the user to the vibrations generated by directed sound energy.

Further, in other alternate embodiments, system 10 may not include actuator 26 or any other haptic output device, and a separate device from system 10 includes an actuator or another haptic output device that generates the haptic effects, and system 10 sends generated haptic signals to that device through communication device 20.

In one embodiment, actuator 26 may be a "standard definition" ("SD") actuator that generates vibratory haptic effects at a single frequency. Examples of an SD actuator include an ERM and an LRA. In contrast to an SD actuator, a high definition ("HD") actuator or high fidelity actuator such as a piezoelectric actuator or an EAP actuator is capable of generating high bandwidth/definition haptic effects at multiple frequencies. HD actuators are characterized by their ability to produce wide bandwidth tactile effects with variable amplitude and with a fast response to transient drive signals. However, HD actuators have a large physical dimension relative to SD actuators, and are more expensive than SD actuators. Most devices consequently include only one or more SD actuators, instead of any HD actuators. Therefore, some embodiments may leverage one or more speakers 28 in a devices in combination with the SD actuators to simulate HD haptic effects and provide an HD-like haptic experience without the need for HD actuators.

System 10, in one embodiment, further includes a speaker 28. Processor 22 may transmit an audio signal to speaker 28, which in turn outputs audio effects. Speaker 28 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, a digital loudspeaker, etc. In alternate embodiments, system 10 may include one or more additional speakers, in addition to speaker 28 (not illustrated in FIG. 1). Further, in other alternate embodiments, system 10 may not include speaker 28, and a separate device from system 10 includes a speaker that outputs the audio effects, and system 10 sends audio signals to that device through communication device 20.

System 10, in one embodiment, further includes a sensor 30. Sensor 30 may be configured to detect a form of energy, or other physical property, such as, but not limited to, sound, movement, acceleration, biological signals, distance, flow, force/pressure/strain/bend, humidity, linear position, orientation/inclination, radio frequency, rotary position, rotary velocity, manipulation of a switch, temperature, vibration, visible light intensity, etc. Sensor 30 may further be configured to convert the detected energy, or other physical property, into an electrical signal, or any signal that represents virtual sensor information. Sensor 30 may be any device, such as, but not limited to, an accelerometer, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gauge, a hygrometer, a linear position touch sensor, a linear potentiometer (or slider), a linear variable differential transformer, a compass, an inclinometer, a magnetic tag (or a radio frequency identification ("RFID") tag), a rotary encoder, a rotary potentiometer, a gyroscope, an on-off switch, a temperature sensor (such as a thermometer, thermocouple, resistance temperature detector, thermistor, temperature-transducing integrated circuit, etc.), a microphone, a photometer, an altimeter, a biological monitor, a camera, a light-dependent resistor, etc., or any device that outputs an electrocardiogram, an electroencephalogram, an electromyograph, an electrooculogram, an electropalatograph, or any other electrophysiological output.

In alternate embodiments, system 10 may include one or more additional sensors, in addition to sensor 30 (not illustrated in FIG. 1). In some of these embodiments, sensor 30 and the one or more additional sensors may be part of a sensor array, or some other type of collection/arrangement of sensors. Further, in other alternate embodiments, system 10 may not include sensor 30, and a separate device from system 10 includes a sensor that detects a form of energy, or other physical property, and converts the detected energy, or other physical property, into an electrical signal, or other type of signal that represents virtual sensor information. The device may then send the converted signal to system 10 through communication device 20.

Haptic Device Sharing Service

Generally, with known systems, a haptic device of a user is utilized to provide haptic effects to that user. For example, wearable haptic devices of a user (e.g., wrist bands, headbands, eyeglasses, rings, leg bands, arrays integrated into clothing, etc.) can provide haptic effects corresponding to state information intended for that user, such as incoming calls, navigational cues, messaging, etc.

The Internet of Things ("IoT") is a network of objects (e.g., buildings, devices, vehicles, etc.) that include electronic functionality for collecting and exchanging data. An increasing number of objects are becoming connected to the IoT, including some objects that are touched frequently, such as chairs and tables in public places. At the same time, haptic actuators are also making their way into many objects, such as furniture (e.g., chairs, tables, etc.), architectural elements (e.g., walls, floors, etc.), and various consumer objects such as rulers, staplers, etc. However, in known systems, providing haptic feedback to a user is generally limited to personal devices of that user or special purpose devices intended for a specific use. For example, in some known systems, haptic notifications are produced on devices that the user holds or wears such as a smart phone or a smart watch, or on specialized devices configured for a specific use such as a D-Box seat in a movie theater.

In contrast to known systems, embodiments of the present invention identify available networked haptically enabled devices (e.g., haptically enabled IoT devices) in the vicinity of a user and use them to provide haptic effects intended for that user. One embodiment provides a service infrastructure that allows a haptically enabled device to opportunistically produce haptic feedback for a user in its environment. One embodiment further provides a brokerage system that allows micro-transactions to be concluded between independent parties for using such haptically enabled devices, thus enabling a sharing economy for haptic feedback.

In one embodiment, as a user comes in close proximity to, or in contact with, one or more IoT connected and haptically enabled objects throughout the day, each of these objects may be used to provide haptic feedback to the user. For example, in a public place such as an airport or a coffee shop, objects that are touched frequently (e.g., chairs, tables, etc.) and are equipped with haptic actuators may be used to haptically communicate with a nearby user, instead of or in addition to the user's haptically enabled personal devices such as smart phones or wearables.

Figure 2:
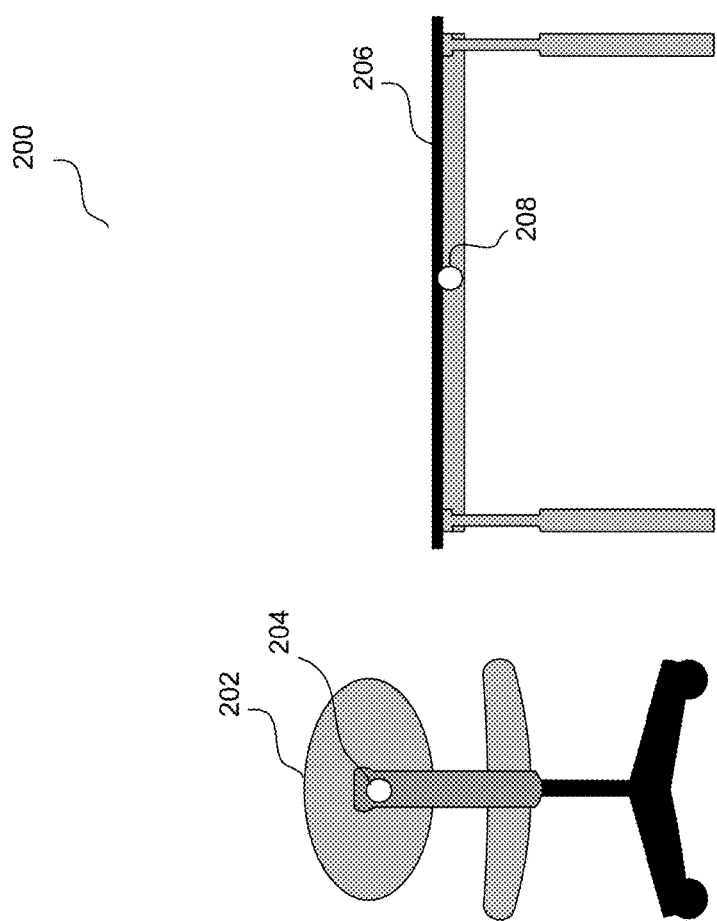
FIG. 2 illustrates an example system for providing haptic functionality according to an embodiment of the present invention.

FIG. 2 illustrates an example system 200 for providing haptic functionality according to an embodiment of the present invention. In system 200, a user may be sitting on a haptically enabled chair 202 in a public place. Chair 202 includes a haptic actuator 204 (e.g., an ERM actuator). Chair 202 also includes functionality to connect to the IoT or any other network. For example, chair 202 may include a WiFi connection module for connecting to a WiFi network. Similarly, chair 202 may include other modules for connecting to any other network described herein with reference to various embodiments. Accordingly, actuator 204 may be shared through the IoT and chair 202 may produce haptic notifications to the user through actuator 204. Such haptic notifications may be provided to the user instead of or in addition to haptic notifications provided by a personal device of the user such as a smartphone in the user's pocket.

Alternatively or additionally, the user may be placing their hands or one of their personal devices (e.g., a laptop computer, a tablet, etc.) on a haptically enabled table 206 in a public place. Table 206 includes a haptic actuator 208 (e.g., an ERM actuator). Table 206 may also include functionality to connect to the IoT. Accordingly, actuator 208 may be shared through the IoT and table 206 may produce haptic notifications to the user through actuator 208.

One embodiment provides an infrastructure that enables communication between the user's computing devices/services and the opportunistic, possibly publicly available, actuators in the user's environment. Such infrastructure may provide economic incentive to encourage setting up and sharing such opportunistic actuators, and this may in turn result in these actuators to become more common in the environment.

An example of a haptically enabled device that may be opportunistically used is a stapler with a haptic actuator configured to vibrate when the stapler is empty. Any haptic actuators may be opportunistically used in haptically enabled devices, such as actuators that are based on haptic technologies that require contact (e.g., vibration, deformation, temperature, etc.) or those that are based on non-contact haptic technologies (e.g., projected ultrasounds, air jets, static ESF, etc.).

One embodiment provides a network infrastructure that allows haptic actuators in a user's environment to be used opportunistically. For example, when a user sits on a chair, their smartphone may detect the availability of a haptic actuator in the chair, establish communication with it, and use it to produce a haptic track for a movie that is played back on the smartphone. In one embodiment, the haptified chair belongs to the user and is used exclusively by the user. In another embodiment, the haptified chair belongs to a third party, and the owner of the chair may register it with a service such that its haptic actuator becomes available for others to use. The service can then manage micro-transactions between the haptic provider (i.e., the owner of the chair) and the user that desires haptic feedback. In one embodiment, the provider may charge a fee (e.g., $0.001) for every notification produced on the haptic chair. The service thus enables a sharing economy for haptic actuators, and therefore can encourage their spread in the environment.

In one embodiment, for example, a user may be sitting in a coffee shop and watching a movie on their tablet device. As the user presses "play," a pop-up notification may appear asking the user if they would like to use the publicly available chair's haptic actuator for $1 per hour. If the user presses "yes," they may watch the movie while receiving corresponding haptic effects from the chair.

In one embodiment, for example, a user's smartphone may determine that the user is late for a meeting. The smartphone may then identify haptically enabled objects that are likely to be touched by the user, and use them to provide haptic effects to notify the user. For example, a user may touch a haptically enabled stapler and feel a distinct vibration pattern that is provided based on communication with the user's smartphone to indicate that the user is late for the meeting. The smartphone may produce such notifications on any haptically enabled object that the user is likely to touch.

In one embodiment, a user is looking for an item in a supermarket and types a corresponding request on their smartphone to be guided toward the correct aisle by haptic feedback on the floor. When the user walks in front of the correct aisle, the floor tiles vibrate to indicate to the user to make a turn into that aisle. In an alternative or additional embodiment, an air puff may be provided to guide the user into the correct aisle.

In one embodiment, a haptically enabled device that is dedicated to a person, object, or task is opportunistically used to provide haptic effects to a random person that is in its proximity. In one embodiment, the dedicated haptically enabled device implements a haptic technology that facilitates such opportunistic functionality, such as projection haptics, floor haptics, etc. For example, an ultrasound emitter worn on a person's neck may be used to provide haptic notifications to another person that is passing by. Similarly, a haptic floor pad intended for a kiosk may be used to provide haptic feedback as a person walks on it. In one embodiment, a distributed system detects when an opportunistic device is available in a person's environment, and a communication platform facilitates the sharing of the opportunistic device with that person.

In one embodiment, when a haptically enabled device that is dedicated to a first person is opportunistically used to provide haptic effects to a second person that is in its proximity, a feedback (e.g., a haptic or other type of notification) is provided to the first person to indicate that their device is being opportunistically used to provide haptic effects to another person. For example, a smartphone of the first person may provide textual, audio, visual, and/or haptic notification to indicate to the first person that one of their haptically enabled devices (e.g., an ultrasound emitter worn on the first person's neck) is being used to provide haptic effects to the second person. The first person may then have the option to ignore the notification or disallow/terminate such opportunistic use.

In one embodiment, when an opportunistic haptically enabled device is available for providing haptic effects to a person, a wearable device or a mobile device of that person provides feedback to that person to indicate that haptic effects are being provided via the opportunistic device. In one embodiment, the feedback is provided with a distinctive haptic effect. The feedback may also provide a directional cue to indicate where the opportunistic device is located. The feedback may also provide other haptic content associated with what is provided by the opportunistic device. For example, the feedback may correspond to a background haptic track that matches the haptic content provided by the opportunistic device.

One embodiment provides opportunistic haptic functionality by implementing a haptic device in a user's environment, a user agent for requesting haptic feedback from the haptic device, and a broker service to establish connections between the user agent and the haptic device. The user agent may be implemented anywhere in the system. For example, the user agent may be decoupled from the haptic device and may receive input from a variety of devices. In some embodiments, the user agent may be implemented in the cloud, in a local network, etc. In some alternative or additional embodiments, a mobile device of a user may include an actuator as well as a user agent for the mobile device and/or other devices such as devices in the user's device network (e.g., wearables, haptically enabled personal items, etc.). Further details of the haptic device, the user agent, and the broker service are provided as follows.

Haptic Device

In one embodiment, one or more network connected haptic devices are embedded in a user's environment, for example, in furniture, architectural elements such as walls and floors, common objects, computational devices, etc. Each haptic device includes a haptic actuator, as well as functionality to communicate (e.g., wirelessly or through a wire) with user devices and/or web services. The haptic device also includes electronics and software in order to drive the haptic actuator.

The haptic actuator may provide haptic functionality according to any embodiments described herein. For example, the haptic actuator may provide haptic feedback including vibration, deformation, heat, ESF, or any other type of haptic actuation. For example, a haptic device in a user's environment may be a table covered with a friction display such that varying textures can be felt when sliding a hand or finger on its surface. As another example, a vibration actuator may be embedded into floor tiles so that it can transmit vibrations to the feet of a user. As another example, an ultrasound emitter can be embedded in a wall so that it can project haptic effects to nearby users. As another example, a peltier cell can be embedded in a door handle so that it can change its temperature when touched by a user. Alternatively or additionally, smartphones, wearables, or other personal computing devices that include haptic actuators can be used to provide haptic effects to the user.

The haptic device also includes functionality to communicate directly or indirectly with a user device or service regarding providing opportunistic haptic functionality. For example, the haptic device may connect to the Internet directly through a WiFi or other wireless network or indirectly through a gateway using Bluetooth or other IoT networking technologies. The haptic device may also connect directly to the user's device using Bluetooth or other short range wireless technologies. In some embodiments, the communication may first be established through near field communication ("NFC"), WiFi, or other wireless technologies, and then switched to a more efficient short-range technology such as Bluetooth.

In one embodiment, once the haptic device is connected to other devices and services through wired or wireless communication, it can receive commands for providing haptic effects. It may also communicate to provide various information, for example, information about its capabilities, its sensor readings, etc.

In one embodiment, the haptic device is discoverable by the user's device and/or service so that the embodiment can determine when the haptic device is within range of a user. For contact based haptic actuators (e.g., vibration actuators), the haptic device is within range of a user if the user is touching a surface that the actuator can produce haptic effects on. For non-contact based haptic actuators (e.g., ultrasound haptics), the haptic device is within range of a user when the user is within a certain distance of an emitter of the device and there are no obstructions between the emitter and the user.

In one embodiment, instead of or in addition to determining which haptic devices are within range of a user, it is determined which haptic devices are in the vicinity of the user. This embodiment is applicable, for example, when it is difficult to determine with sufficient accuracy whether a haptic device is within range. For example, in one embodiment, without knowing which haptic devices are able to produce haptic effects that can be felt by the user, it is determined which haptic devices are near the user's location. One embodiment may provide a list of nearby haptic devices to the user and let the user decide which device to use through a graphical UI.

In one embodiment, a user may explicitly request to use a specific haptic device through an interaction with the haptic device or with the object in which the haptic device is embedded (i.e., the haptified object). In one embodiment, the user may interact with the haptified object so that the interactions can be captured by sensors in the object to select the object and/or to put the object in a discovery mode. For example, a user may tap their phone or wearable device against an NFC tag on a table or another haptified object to indicate that they desire to use haptic actuators of the table/object. For example, when the user taps their phone against the object, the resulting vibrations and/or sounds can be captured by sensors on both the phone and the object and compared to establish a connection between the haptified object and the phone (e.g., as in the contacts and file sharing "Bump" application from Bump Technologies). In one embodiment, the user may press a button on the haptified object and a corresponding button on their phone to establish a Bluetooth communication between the haptified object and the phone so that haptic actuators of the object may be used to provide haptic effects to the user.

In one embodiment, a projection haptic device may be paired with one or more remote sensors such as cameras or depth sensors that can detect the presence of a user within range of the haptic device. In one embodiment, the identity of the detected user may be determined by any known functionality such as computer vision and a comparison with data stored in a database to establish a match. For example, one embodiment may capture an image of the user using a camera, and use the image to perform facial recognition, read a name tag associated with the user, and/or otherwise identify the user. The embodiment may then communicate with a server (e.g., a server for a social network, dating website, search engine, personal website, etc.) to determine additional characteristics about the user. The characteristics may include, for example, name, social security number, net worth, height, age, heritage, hair color, nationality, eye color, medical condition, credit score, gender, credit card number, username (e.g., for a website or account), password, temperament, mood, employer, job, hobby, likes, dislikes, etc.

In one embodiment, a haptic device that requires contact with a user to provide haptic effects may use sensors to determine whether the user is touching a surface on which the device applies haptic effects. In one embodiment, the surface may be equipped with a capacitive touch sensor, a pressure sensor, or other sensors that can detect a touch. In an alternative or additional embodiment, an accelerometer may detect contact with the body of the user and/or brushing against the surface. In one embodiment, for example, pressure sensors in a chair may be used to detect whether a user is sitting on it, and this information may be paired with other sensor data to determine the identity of the user that is touching a surface when such touch has been detected.

In one embodiment, the haptified device includes an interaction sensor configured to detect an interaction with the device, and/or an object that includes the device, by a user (e.g., using a finger, foot, hand, arm, head, leg, or other body part). In one embodiment, the user interaction may include touching the object, gesturing in real space, gesturing using the object (e.g., picking up the object and moving it in real space), and/or gesturing on an object (e.g., swiping a finger along a surface of the object). The interaction sensor is further configured to generate a sensor signal associated with the interaction. The interaction sensor may include an accelerometer, a gyroscope, a camera, an RFID tag or reader, an indoor proximity system, a NFC communication device, a global positioning system ("GPS") device, a magnetometer, an ultrasonic transducer, a wireless interface (e.g., an IEEE 802.11 or Bluetooth interface), an infrared sensor, a depth sensor, and/or a range sensor.

For example, in one embodiment, the interaction sensor includes a wireless interface that is configured to detect the strength of a wireless signal emitted by an object. The interaction sensor may generate a sensor signal associated with the wireless signal strength. Based on the wireless signal strength, the embodiment may determine, for example, whether the sensor is within a predefined distance of the object. If so, the embodiment may determine an interaction (e.g., coming within a predefined distance of the object) occurred. In one embodiment, the object may be carried by a person, and therefore proximity of the object with the sensor would indicate proximity of the person with the sensor.

In another embodiment, the interaction sensor may be a 3D imaging system that is oriented toward the haptified device. Accordingly, the interaction sensor may detect a user interaction (e.g., tap, touch, gesture on, shake, lift, gesture toward, etc.) with the device. For example, the interaction sensor includes a camera oriented toward the device. A user may make a gesture (e.g., a check mark sign) in the air (e.g., with a body part, such as a finger, hand, arm, foot, head, or leg) near the device. The interaction sensor may capture images associated with the gesture and generate sensor signals. Based on the sensor signals, the embodiment may determine that a user interaction occurred. The embodiment may further analyze the sensor signals to determine the specific type of gesture that occurred. For example, the embodiment may analyze the sensor signals and determine that the user made a check mark in the air with a finger.

In some embodiments, the interaction sensor is external to the haptified device and in wired or wireless communication with the device. For example, the interaction sensor may include a camera associated with the device and in communication with the device. As another example, the interaction sensor may comprise a 3D imaging system (e.g., the 3D imaging system commonly sold under the trademark Microsoft Kinect®) or an LED-based tracking system positioned external to the device (e.g., on a shelf in a store) and in communication with the device.

In some embodiments, the user may use an intermediary object (e.g., a stylus, pen, cane, or wand) for an interaction with the haptified device, and the embodiment may detect such an interaction.

One embodiment may detect a contact anywhere on the object that includes the haptified device, or a contact with a specific location (e.g., a label) on the object. The embodiment may detect a location of the contact. For example, the embodiment may detect which portion of the object (e.g., top, bottom, left side, right side, front, back, a label, an image, a logo, a piece of text, etc.) was contacted by the user. In one embodiment, the user may gesture on a surface of the object to interact with it. For example, the user may perform a two finger pinch on, move multiple fingers along, or make a checkmark on a surface of the object.

In some embodiments, the user may interact with the object by making a gesture using the object or a portion of the object. For example, the user may move the object or a portion of the object in real 3D space (e.g., using the object or a portion of the object to draw a letter or number in the air, rotating, tilting, shaking, etc.). One embodiment may detect more than one user interactions with the object (e.g., making a gesture in front of the object, contacting the object, making a gesturing along a surface of the object, and making a gesture using the object). In some embodiments, a user interaction may include causing an interaction between multiple objects. For example, the user may tap an object against another object.

One embodiment may detect a user interacting with (e.g., tapping, holding, gesturing on, or gesturing toward) a first object with a first body part and interacting with a second object with a second body part. For example, the embodiment may detect the user interacting with the first object with the user's right hand and interacting with the second object with the user's left hand.

One embodiment may receive a first set of GPS data from the interaction sensor. The user may also carry a device that also includes GPS functionality and transmits a second set of GPS data. The embodiment may compare the first set of GPS data with the second set of GPS data and determine the relative distance between the user and the haptified device. If the user is within a predetermined distance from the device, the embodiment may determine that a user interaction has occurred.

The haptified device may further include one or more additional sensors configured to generate sensor signals. In some embodiments, the sensors may include, for example, a humidity sensor, ambient light sensor, gyroscope, GPS unit, accelerometer, range sensor, depth sensor, biosensor, camera, or temperature sensor. In some embodiments, the sensors may be external to the device and in wired or wireless communication with the device. For example, the sensors may include a biosensor coupled to a wearable device (e.g., a ring or wristband). The biosensor may be configured to wirelessly transmit sensor signals to the device, which may be, for example, positioned in the user's pocket.

In one embodiment, the interaction sensor includes a microphone positioned to detect sounds associated with the manipulation of a haptified object. For example, a user may shake a tin of coffee or a box of cereal on a haptified table. The interaction sensor may detect sounds associated with the shake. The interaction sensor may generate sensor signals associated with the sounds. Based on the sensor signals, the embodiment may determine that a user interaction has occurred.

In one embodiment, the interaction sensor includes an optical sensor. An object may be positioned for blocking light from reaching the interaction sensor. For example, the object may sit on top of an interaction sensor embedded in a haptified table. Upon a user moving the object or manipulating the object, the interaction sensor may detect a change in the amount of light. The interaction sensor may generate sensor signals associated with the change in the amount of light. Based on the sensor signals, the embodiment may determine that a user interaction occurred, or determine a characteristic of the user interaction (e.g., if the user moved the object a distance that is above a threshold).

One embodiment determines a characteristic (e.g., an amount of pressure, speed, direction, location, or type of gesture) associated with the interaction. The embodiment analyzes sensor signals from the interaction sensor or any other sensors to determine the characteristic. For example, the embodiment may analyze images from a 3D imaging system to determine a type of gesture (e.g., swipe, two-finger pinch, shake, etc.) made by the user.

One embodiment determines a characteristic associated with the interaction using swept frequency capacitive sensing. Swept frequency capacitive sensing may include measuring the change in the capacitance of an object (e.g., in voltage) at a plurality of frequencies as a user interacts with a haptified object. The embodiment may generate a profile of the user interaction based on the changed capacitances at the plurality of frequencies. One embodiment may compare the profile to predetermined interaction profiles. In one embodiment, each predetermined interaction profile may include a unique distribution of changes in capacitance at the plurality of frequencies and may be associated with a different user interaction (e.g., a two finger pinch, a full hand grasp, or a single finger tap). For example, a predetermined interaction profile associated with a two finger pinch may be different than a predetermined interaction profile associated with a full hand grasp. Accordingly, the embodiment may determine specifically how the user is interacting with the object.

One embodiment determines a characteristic associated with the interaction based on sound signals from the interaction sensor. For example, the interaction sensor may include a microphone. The embodiment receives sensor signals from the interaction sensor and compares data from the sensor signals with one or more sound profiles. In one embodiment, each sound profile may include sound data that is associated with a different user interaction, for example, a user touching an object with a finger, a knuckle, a finger nail, or a palm. For example, a sound profile associated with a finger contacting an object may include a different frequency response than a sound profile associated with a knuckle contacting the object. Accordingly, the embodiment determines which body part of the user is interacting with the object.

One embodiment implements testing functionality to confirm whether a haptified object is within range of a user. For example, after a user has been determined to be in range of a haptified object, the object may be tested to produce a haptic effect, and a user's device may be used to detect the haptic effect by a sensor such as an accelerometer. Accordingly, the embodiment may confirm that haptic effects generated by the object can reach the user.

User Agent

One embodiment implements a user agent which is a device or service that represents the user in requesting haptic feedback from haptic actuators in the user's environment. In one embodiment, the agent first determines when haptic feedback is required by the user and what haptic feedback should be produced. In one embodiment, for example, the user agent collaborates with an application running on the user's phone to determine when haptic feedback is required by the user and what haptic feedback should be produced. For example, as the user watches a video on their device, a media player application may transmit the haptic track of the video to the user agent. Similarly, the operating system of the user's smartphone may transmit a haptic notification to the user agent for playback.

The user agent then establishes a connection with a haptic actuator and requests playback of a haptic effect or streaming of a sequence of haptic effects. The connection may be established according to any of the embodiments described herein. For example, the user agent may detect the Bluetooth beacons of nearby haptic actuators and determine which one is most likely to produce acceptable haptic feedback for the user.

In one embodiment, the communication between the user agent and the haptic actuator may take place directly (e.g., using Bluetooth). In some embodiments, however, the communication may instead go through a third party service that connects user agents with haptic actuators. In these embodiments, the user agent may communicate with this service (e.g., a server) to request a connection to a specific device or a list of nearby devices. Communications can then continue indirectly through this server, or the user agent may later establish a direct connection to a device through Bluetooth communication.

Broker Service

One embodiment uses a broker service to establish connections between user agents and haptic actuators so that the haptic actuators may be shared by the users represented through the user agents. In one embodiment, the service is a third party service that is provided independently of haptic actuators and user agents. In one embodiment, the service is a web service that collects various information about the haptic actuators such as their type, location, range, haptic capabilities, etc. This information may be provided by the owner of the haptic actuators in order to make them available through the service. In one embodiment, the service tracks the location of mobile haptic actuators. For example, the service may track the location of the haptic actuators using GPS, indoor positioning data, cameras, etc. In one embodiment, the service interacts indirectly with the haptic actuators using a framework that allows for managing connected accessories/devices such as Apple's HomeKit, SmartThings hub, etc.

In one embodiment, when a user desires to find a shared device and receive haptic feedback, a corresponding user agent communicates with a broker service to determine if any haptic actuators are available near the user and/or if the user is within range of any haptic actuators. The broker service may use the location of the user as well as any other available sensor data (e.g., an interaction sensor or any other sensor according to any embodiments described herein) to determine which actuators are near the user. The broker service may then provide availability and other information (e.g., capability, type, etc.) of the available actuators to the user agent such that a connection can be established between the user agent and an identified actuator to let the user receive haptic feedback from the haptic actuator.

In one embodiment, the broker service may include a payment system. For example, in one embodiment, a provider of an available haptic actuator may indicate an associated cost (e.g., per unit of time, per haptic effect, etc.) for using its haptic actuator. The cost may be fixed or may change dynamically depending on various parameters such as time, competitor pricing, supply and demand, and other external factors in the market. An example of a service that implements dynamic pricing is Uber. In one embodiment, the broker service collects the cost information from the providers of haptic actuators (e.g., price per haptic effect, per unit of time, etc.) so this information can be provided to a user agent that inquires about shared haptic actuators. If the user agrees to pay the cost to receive haptic effects from a shared actuator, the broker service implements the payment system to receive payment from the user for using the shared haptic actuator.

In one embodiment, the owner of a haptic actuator may determine a price for the use of the haptic actuator as a function of the time of day. In this embodiment, a user agent is informed of such price when making a request to use the haptic actuator. In one embodiment, the user agent accepts or rejects the service offer based on rules, such as the maximum price set by the user represented by the user agent. In one embodiment, for example, the user agent may select the least expensive available haptic actuator or ask the user whether or not to accept a service offer.

In one embodiment, the broker service and/or the user agent determine the best shared haptic actuator to use based on the context of use. For example, in one embodiment, the haptic track of a movie may be better provided by HD actuators while a SD actuator may be sufficient for some haptic notifications. In one embodiment, after identifying and collecting information about available shared haptic actuators, the broker service and/or the user agent may determine that the best actuator to use is a haptic actuator of one of user devices of the user.

One embodiment identifies haptic actuators and makes them available through a global network such as the IoT. In one embodiment, a broker service is implemented as a web service where haptic actuators register in the cloud and are then available for other users that reach the cloud and desire to use available haptic actuators.

Figure 3:
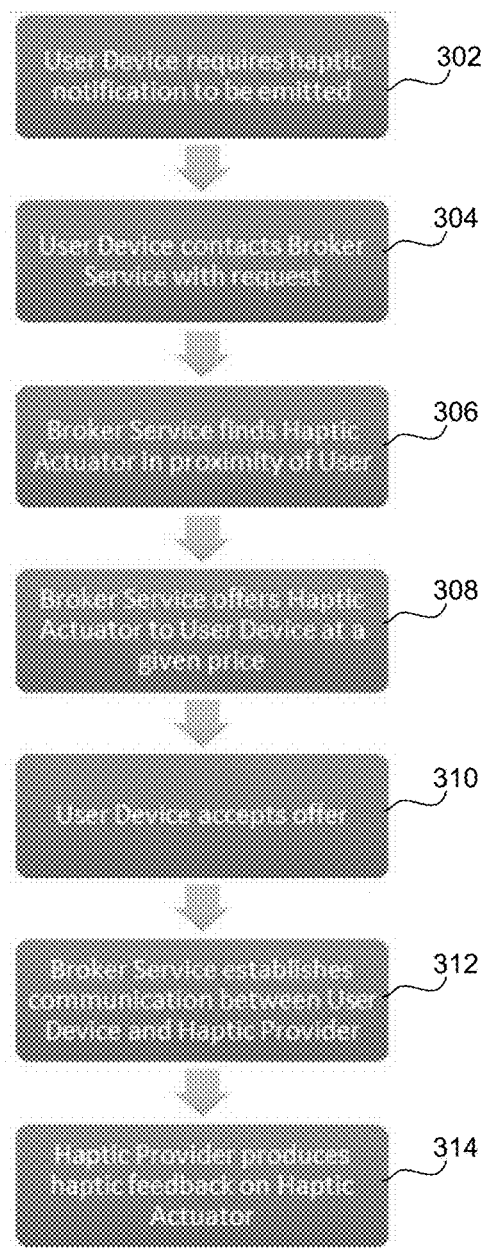
FIG. 3 is a flow diagram of haptic functionality in accordance with embodiments of the present invention.

FIG. 3 is a flow diagram of haptic functionality in accordance with embodiments of the present invention. In one embodiment, the functionality of the flow diagram of FIG. 3 (and FIGS. 7-9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302 a user device of a user indicates that a haptic notification needs to be provided to the user. For example, a smartphone of a user may receive information or otherwise determine that the user needs to be haptically alerted of a notification.

At 304 the user device contacts a broker service with a request to provide the haptic notification to the user.

At 306 the broker service identifies haptic actuators that are in the proximity of the user. For example, the broker service may use GPS or indoor positioning functionality of the user device and one or more shared haptic actuators to determine if the user is nearby or within range of the haptic actuators.

At 308 the broker service offers a haptic actuator to the user device at a given price (e.g., per haptic notification, per unit of time, etc.). The price may have been set by a provider of the haptic actuators as a fixed or dynamic price.

At 310 the user device accepts the offer to use the haptic actuator at the given price.

At 312 the broker service establishes a communication between the user device and the haptic provider. In some embodiments, the haptic provider is implemented within the object that embeds the haptic actuator. In some other embodiments, the haptic provider is separate from the haptic actuator, and the haptic actuator identifies/registers itself with the haptic provider so that the haptic provider can determine what haptic effects to send to the device/object that embeds the haptic actuator.

At 314 the haptic provider produces haptic feedback on the haptic actuator. Accordingly, the user receives the haptic notification via the shared haptic actuator of the haptic provider.

Haptic Alerts Based on Information from IoT Items or Mobile Devices

In one embodiment, various IoT items and/or mobile devices are utilized to collect information pertinent to a user and to provide corresponding haptic effects to the user. Examples of such items/devices are smartphones, smart watches, smart wallets, smart cloths, smart fridges, or any other items that include functionality for connecting to a cloud system or to another network system and for providing information to the cloud system or the network system.

In one embodiment, the haptic effects may correspond to an alert that is necessitated by the information collected from the IoT items and/or mobile devices. For example, information from the IoT items and/or mobile devices of a user may be processed to determine if the user is missing or needing an item and provide corresponding alerts to the user if necessitated. The alert may be a haptic alert that is provided to the user by a haptically enabled device/object of the user or by a shared haptic actuator as described herein with reference to various embodiments.

Figure 4:
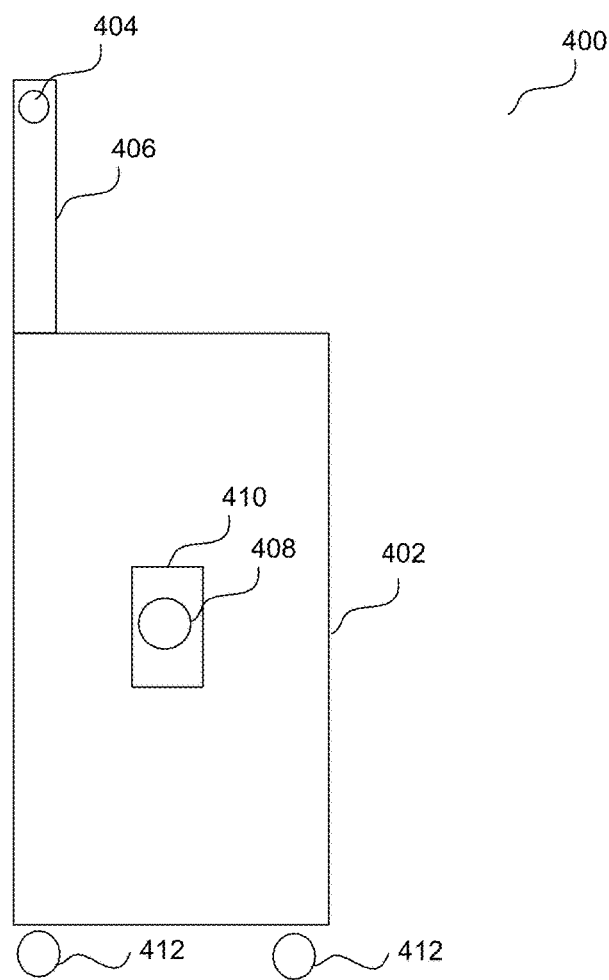
FIG. 4 illustrates another example system for providing haptic functionality according to an embodiment of the present invention.

FIG. 4 illustrates an example system 400 for providing haptic functionality according to an embodiment of the present invention. System 400 includes a user's suitcase 402 that can provide a haptic alert to the user based on information collected from the IoT items and/or mobile devices of the user. For example, the haptic alert may be provided to the user by a haptic actuator 404 on a telescopic handle 406 of suitcase 402 and/or by a haptic actuator 408 on a side handle 410 of suitcase 402. Actuators 404 and 408 may implement any haptic functionality described herein with reference to various embodiments. For example, actuators 404 and 408 may implement functionality according to TouchSense™ software by Immersion Corp.

In one embodiment, in addition to haptic actuator 408, side handle 410 of suitcase 402 may include a weight sensor that can be used to determine the weight of suitcase 402 when lifted by side handle 410 so that a haptic notification may be provided to the user via haptic actuator 408 or via another haptically enabled device within range of the user to indicate if suitcase 402 is overweight.

In one embodiment, suitcase 402 may include various personal items of the user that are connected to the IoT, such as smart clothing or smart electronic devices. The IoT items of the user may send information to a cloud service which collects the information and compares it with a list of items that the user has indicated as required to being packed in suitcase 402. Such list may have been previously compiled and provided by the user to the cloud service. If the comparison indicates that the user is missing an item that should have been included in suitcase 402, a distinctive haptic alert is provided to the user by haptic actuator 404 on retractable handle 406 of suitcase 402 or by another haptically enabled device within range of the user.

In one embodiment, suitcase 402 may also include various sensors that are used to collect information and provide haptic notification to the user. For example, wheels 412 of suitcase 402 may include an acceleration sensor that can be used to determine if the user is on the move. Wheels 412 or any other portion of suitcase 402 may also include GPS or other location functionality that can be used to determine the location of the user. Based on the information provided by the acceleration sensor, the location functionality, and/or the IoT items or mobile device, system 400 may provide any necessitated haptic notifications to the user via haptic actuators 404 and/or 408 or via another haptically enabled device within range of the user. One embodiment may collect further information from IoT items located around the user or synced manually with system 400.

One embodiment provides dynamic haptic alerts based on the location of the user. For example, if the user is lugging suitcase 402 at a shopping area of an airport and the boarding time is close, a haptic notification may be provided to the user via actuator 404 to indicate to the user to return to the gate. In another example, if the user is lugging suitcase 402 at a shopping area of an airport and there is an item missing in suitcase 402, a haptic notification may be provided to the user via actuator 404 to indicate to the user to purchase the missing item at the shopping are.

In one embodiment, after system 400 determines what items are packed in suitcase 402, it may further determine whether the user is moving (e.g., out of a hotel). For example, system 400 may use an acceleration sensor and/or GPS functionality to determine movement that has an intensity that cannot be attributed to just loading suitcase 402. Accordingly, when it is determined that suitcase 402 is moving, system 400 may alert the user if suitcase 402 is missing an item. In one embodiment, the intensity of the alert is increased as the movement is increased. In one embodiment, system 400 may provide an alert to the user via haptic actuator 404 or any other haptically enabled device within range of the user.

One embodiment determines if the user is missing or needing an item by implementing a "checksum" functionality over the items already with the user. For example, a checksum functionality may be applied to the IoT items in suitcase 402 to determine if the user is missing an item. Such checksum functionality may be used to dynamically create corresponding haptic effects to be played back on a haptically enabled device that is closest to the user and/or worn/held by the user, such as haptic actuator 404 of telescopic handle 406 of suitcase 402 or another haptically enabled device within range of the user.

Embodiments are also applicable to any functionality for providing dynamic alerts based on the location of the user. For example, if a user is at a supermarket and their smart fridge indicates that they are missing an item (e.g., milk), a user device or any other haptically enabled device within range of the user may be used to provide a corresponding haptic alert to the user. One embodiment further implements functionality to further specify severity and/or priority of such alerts.

One embodiment determines missing items by labeling items with key features. For example, one embodiment labels each item as a "bucket" or a "simple item," where a "bucket" is an item that holds other items (e.g., a suitcase, a wallet, a purse, a backpack, etc.) and a "simple item" is an item that is placed inside a "bucket" (e.g., clothes, phones, computers, tablets, groceries, etc.). One embodiment further associates relative priorities to the items. For example, a smart wallet may be given the highest priority while a certain piece of casual smart clothing may be given the lowest priority. The embodiment then determines, based on various inputs, (e.g., a user's schedule, location, etc.) which of their "items" they should have with them, and provides alerts based on missing items and the priority of missing items.

One embodiment implements a cloud based haptic control system, or other remote network, that performs device authentication and registration in the cloud, and user data storage of devices and their haptic capabilities in the cloud. The cloud based haptic control system also executes device and effect decision functionality to determine which device to play an effect on and which effect to play. The decision algorithms may be based on user inputs and usage context. Such user inputs may be provided by the same devices or by other components/devices different than the devices.

In one embodiment, for example, the cloud system may be used to establish a connection to a smart device to alert a user of the device if the device is left behind in a security line at an airport. As another example, the cloud system may be used to implement location based alerts (e.g., driving past a gas station, receiving an alert to purchase an item at a supermarket based on data from a smart fridge, etc.). As another example, the cloud system may be used to play a high priority alert when a high priority item is stolen from a user's bag (e.g., a wallet/phone/watch is taken out of a bag).

In one embodiment, a cloud backend executes device and effect decision functionality to control which device plays haptic effects and what haptic effects to play. One embodiment provides device side functionality for connectivity to the cloud and a software development kit ("SDK") that allows the cloud to control haptic playback on a device.

One embodiment implements a peer to peer network of devices where each node (e.g., each device) handles part of the execution of the device and effect decision functionality instead of the cloud backend.

One embodiment tags alerts. By tagging different kinds of alerts, the embodiment may implement a lookup table of the tags and associated alerts so that, upon receiving a tagged notification, the lookup table can be used to determine an alert haptic signal that corresponds to the tag and then relay the alert haptic signal to an appropriate haptic actuator.

Figure 5:
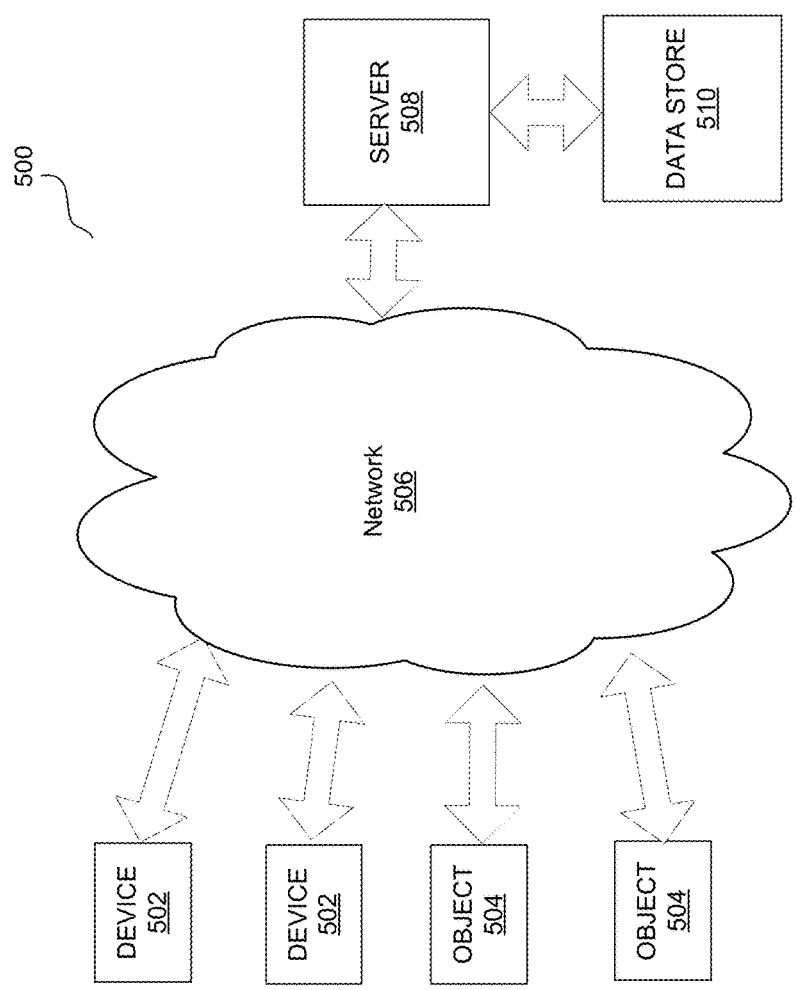
FIG. 5 is a block diagram of an example cloud system for providing haptic functionality in accordance with embodiments of the present invention.

FIG. 5 illustrates an example cloud system 500 for providing haptic functionality in accordance with embodiments of the present invention. In certain embodiments, services provided by cloud system 500 may include a host of services that are made available to users of cloud system 500 on demand, such as online data storage and backup solutions, Web-based e-mail services, hosted office suites and document collaboration services, database processing, managed technical support services, and haptic services. Cloud computing is a model for enabling convenient, on-demand network access to a shared pool of configurable computing resources (e.g., networks, servers, storage, applications, and services). The services provided or accessed through the cloud (or network) are referred to as cloud services. A cloud service provider may make cloud services available to a customer using a device 502 or object 504 that is registered at cloud system 500.

Services provided by cloud system 500 can dynamically scale to meet the needs of its users. A specific instantiation of a service provided by cloud system 500 is referred to as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own personal and/or on-premises servers and systems. For example, a cloud service provider's system may host an application, and a user may, via a communication network such as the Internet, on demand, order and use the application.

Cloud system 500 includes devices 502 and object 504 that implement functionality for connecting to a network 506. Devices 502 may include smartphones, smart watches, smart fridges, etc. Objects 502 may include any IoT objects described herein with reference to various embodiments. Network 506 may include one or more local area networks, wide area networks, the Internet, etc. Further, network 506 may include various combinations of wired and/or wireless networks, such as, for example, copper wire or coaxial cable networks, fiber optic networks, Bluetooth wireless networks, WiFi wireless networks, CDMA, FDMA, and TDMA cellular wireless networks, etc., which execute various network protocols, such as, for example, wired and wireless Ethernet, Bluetooth, etc.

Devices 502 may include haptically enabled personal devices or any other devices that include haptic actuators. Objects 504 may also be haptically enabled and include one or more haptic actuators.

Cloud system 500 further includes a server 508 that is connected to network 506. Server 508 may operate as a backend in cloud system 500 to provide haptic functionality over cloud system 508. Cloud system 500 may also include a data store 510 that is used by server 508 to provide backend functionality over cloud system 500. Server 508 may execute a server side application that communicates with client side applications executing on devices 502 and/or objects 504 to provide haptic effects via haptic actuators in devices 502 and/or objects 504. In one embodiment, the server side application is a web server application that communicates with a web browser application executing on a haptic device 502. Other client-server and distributed software architectures are also contemplated by the present embodiments.

Figure 6:
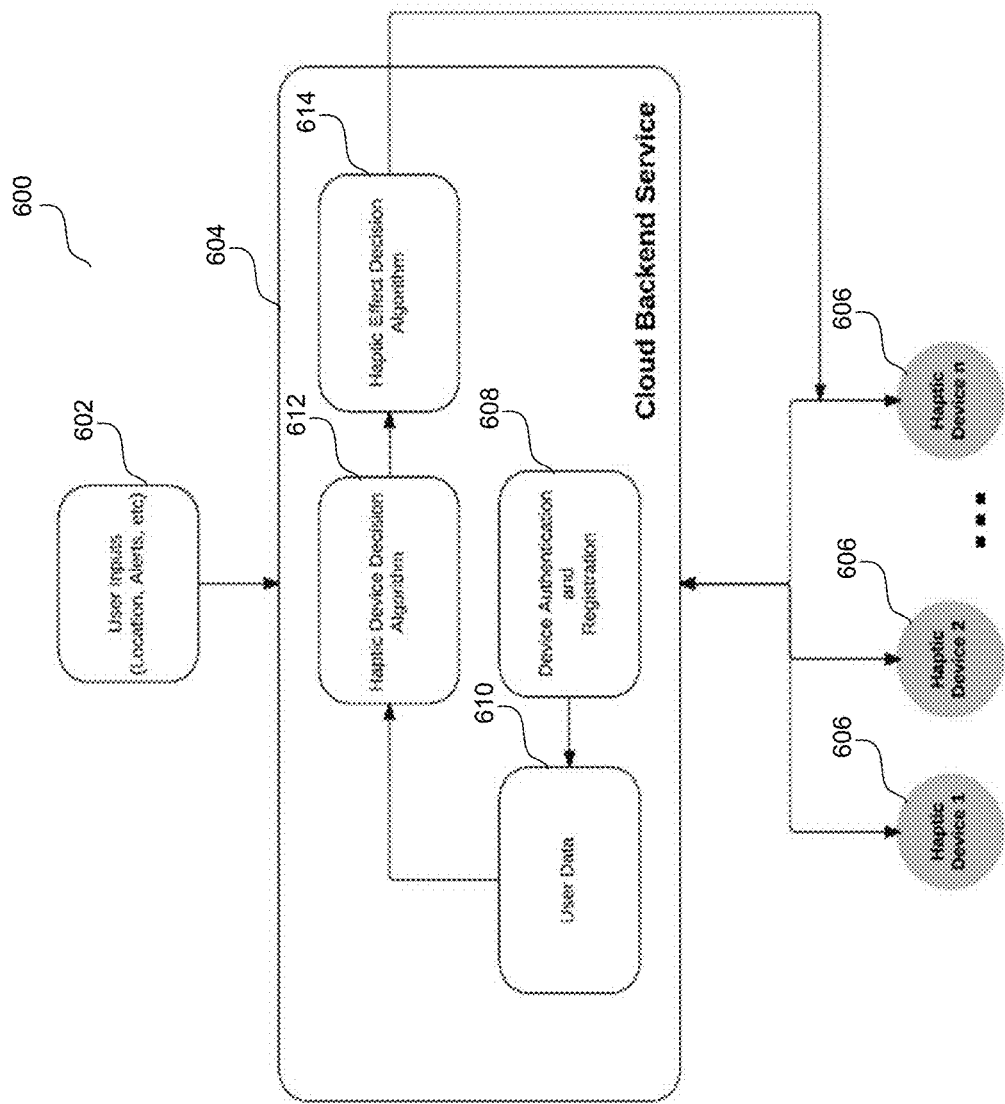
FIG. 6 is a block diagram of another example system for providing haptic functionality in accordance with embodiments of the present invention.

FIG. 6 illustrates an example system 600 for providing haptic functionality in accordance with embodiments of the present invention. System 600 implements device and effect decision functionality over a cloud system such as cloud system 500 in FIG. 5. In system 600, one or more user devices 602 provide various information (e.g., location information, alerts, etc.) to a cloud backend service 604. Cloud backend service 604 may be provided, for example, by server 508 and data store 510 of cloud system 500 of FIG. 5.

Cloud backend service 604 includes a device registration and authentication module 608 that allows for one or more haptic devices 606 to connect to system 600, register with system 600, and be authenticated. Haptic devices 606 may include haptically enabled personal devices (e.g., smartphones, smart watches, etc.) or haptically enabled IoT objects (e.g., chairs, tables, etc.). In one embodiment, haptic devices 606 may include haptically enables devices/objects that are shared by their provider/user over system 600 so they can be used by other users.

Cloud backend service 604 also includes a user data module 610 that receives haptic device information from device registration and authentication module 608 and determines whether a shared/available haptically enabled device/object is nearby or within range of a user that desires to receive haptic effects. User data module 610 may use any user and/or device data available at cloud backend service 604 to make such determination. For example, user data module 610 may make such determination based on the location of haptic devices 606 and the location of the user that desires to receive haptic effects or needs to be notified with a haptic alert.

Cloud backend service 604 also includes a haptic device decision module 612 that receives information about available haptic devices 606 from user data module 610 and determines which haptic devices 606 to use for providing haptic effects to a user. Cloud backend service 604 also includes a haptic effect decision module 614 that receives information about the selected haptic devices 606 from haptic device decision module 612 and determines which haptic effects need to be provided on the selected haptic devices 606 and sends corresponding commands to the selected haptic devices 606.

Figure 7:
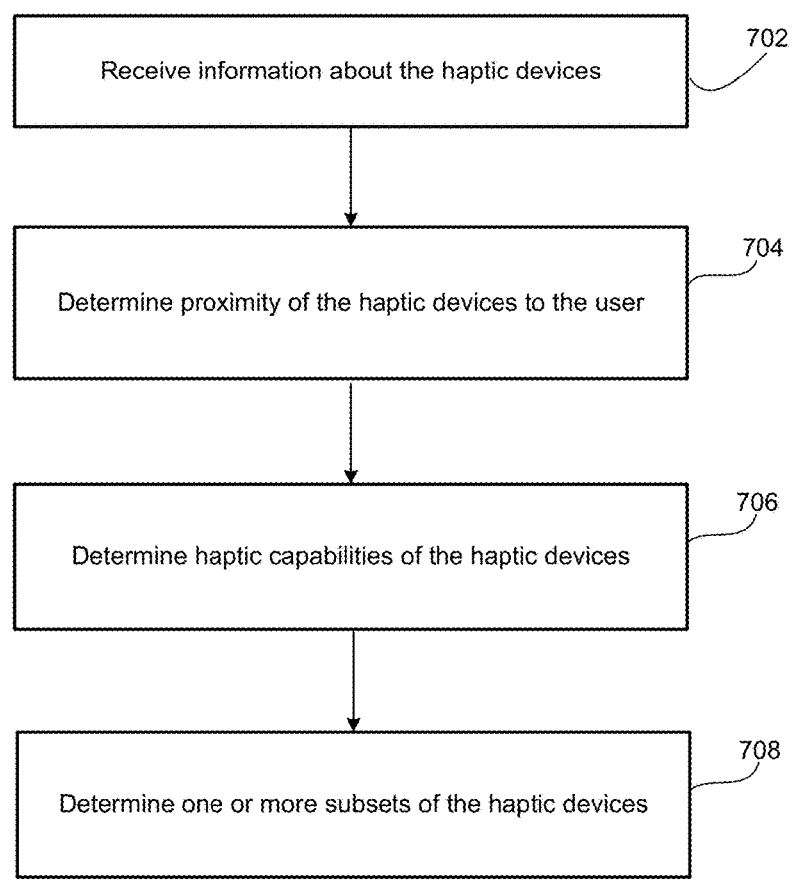
FIG. 7 is a flow diagram of the operation of the haptic device decision module of FIG. 6 in accordance with embodiments of the present invention.

FIG. 7 is a flow diagram of the operation of haptic device decision module 612 of FIG. 6 in one embodiment. At 702 haptic device decision module 612 receives information about available haptic devices 606 from user data module 610. At 704 haptic device decision module 612 determines the proximity of haptic devices 606 to the user. At 706 haptic device decision module 612 determines the haptic capabilities of haptic devices 606. Based on the proximity and haptic capabilities of haptic devices 606, at 708 haptic device decision module 612 determines one or more subsets of haptic devices 606 to use for providing haptic effects to the user.

For example, in one embodiment, haptic devices 606 may be divided into subsets based on their properties (e.g., haptic capabilities, haptic technology (e.g., vibration, projection, deformation, etc.), haptic effect strength/perception, etc.). For example, one subset of haptic devices 606 may include contact based haptic devices that are presumed to be in physical contact with the body of the user, and another subset of haptic devices 606 may include non-contact based haptic devices that are within range of the user. Alternatively or additionally, haptic devices 606 may be divided into subsets based on their geographical location and/or the type/properties of the device/object they are embedded within (e.g., mobile/non-mobile devices, appliances, wearables/non-wearable devices, personal/public objects, secure/non-secure devices (e.g., whether the device is password protected, etc.), battery-powered/line-powered devices, etc.).

Figure 8:
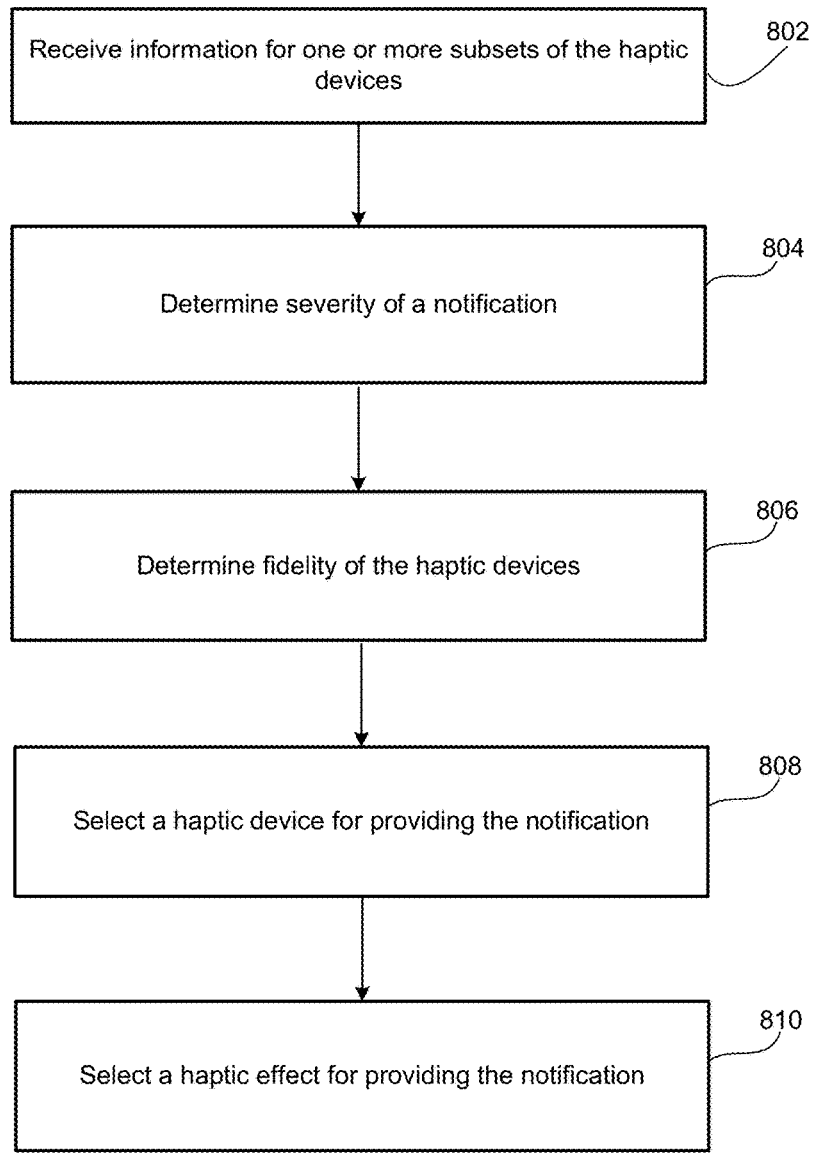
FIG. 8 is a flow diagram of the operation of the haptic effect decision module of FIG. 6 in accordance with embodiments of the present invention.

FIG. 8 is a flow diagram of the operation of haptic effect decision module 614 of FIG. 6 in one embodiment. At 802 haptic effect decision module 614 receives information about one or more subsets of haptic devices 606 determined by haptic device decision module 612 to use for providing haptic effects to the user. At 804 haptic effect decision module 614 determines a severity of a notification that needs to be provided to the user. At 806 haptic effect decision module 614 determines a fidelity of haptic devices in the subsets provided by haptic device decision module 612. Based on the fidelity of the devices and the severity of the notification, at 808 haptic effect decision module 614 select a haptic device for providing the notification to the user. Based on such a selection, at 810 haptic effect decision module 614 selects a haptic effect for providing the notification to the user via the selected haptic device.

In one embodiment, for example, the haptic effect may be selected from a cloud library based on one or more input tags. For example, one embodiment may implement an input tag corresponding to the device type and another input tag corresponding to the alert type, and the input tags in combination identify a haptic effect in the library that is configured to provide such an alert type (e.g., a strong vibration for a high priority alert) on such a device type (e.g., a haptic device that includes a low fidelity vibrating actuator). Once the haptic device and the haptic effects are selected, corresponding information is provided to the haptic device to provide the haptic effect to the user.

Figure 9:
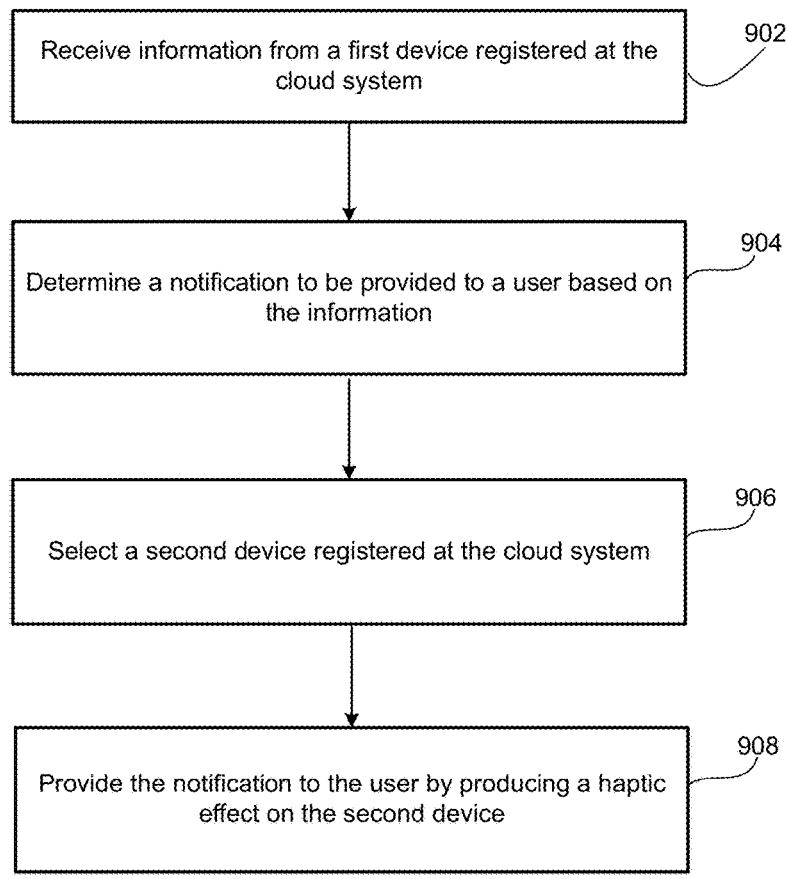
FIG. 9 is a flow diagram of the operation of the haptics module of FIG. 1 when performing haptic functionality in accordance with embodiments of the present invention.

FIG. 9 is a flow diagram of haptics module 16 of FIG. 1 when producing haptic effects in accordance with embodiments of the present invention.

At 902 information is received from a first device registered at the networked system and at 904 a notification is determined to be provided to a user based on the information.

At 906 a second device registered at the networked system is selected. In one embodiment, the second device is selected from a plurality of devices registered at the networked system, and each one of the plurality of devices includes a haptic actuator. In one embodiment, the second device is selected based on a relative location of the second device with respect to the user. In one embodiment, the relative location of the second device with respect to the user is determined based on the information received from the first device and information at the networked system about the second device. In one embodiment, the second device is selected from the plurality of devices further based on a haptic capability of the second device, a severity of the notification, and a fidelity of the second device. In one embodiment, the second device includes a sensor configured to detect a user interaction with the second device, and the second device is selected based on the user interaction.

At 908 the notification is provided to the user by producing a haptic effect on the second device. In one embodiment, the haptic effect is determined based on characteristics of the notification and characteristics of the second device. In one embodiment, the characteristics of the notification include a context of the notification or a severity of the notification. In one embodiment, the characteristics of the second device include a fidelity of the second device or a haptic capability of the second device.

In one embodiment, the information received from the first device indicates that the user is missing an item. In one embodiment, the networked system determines that the user is missing an item based on information received from a plurality of devices registered at the networked system. In one embodiment, the networked system determines that the user is missing an item and by comparing the information received from the plurality of devices with a list of items that the user needs to have, wherein the list is based on a location of the user.

As disclosed, embodiments allow for using various network connected device such as IoT objects/devices to provide haptic effects to a user. In one embodiment, IoT devices are used to collect information pertinent to a user to alert the user if necessary. In one embodiment, network connected haptically enabled devices are opportunistically used to alert a user of a notification when the user is within range or in proximity of such devices. Accordingly, embodiments allow for better haptic notification coverage.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide haptic functionality over a networked system, the processor:

receiving information from a first device registered at the networked system;

determining a notification to be provided to a user based on the information;

selecting a second device registered at the networked system, wherein the second device is selected from a plurality of devices based on a relative location of the second device with respect to the user; and providing the notification to the user by producing a haptic effect on the second device.

2. The computer readable medium of claim 1, wherein the plurality of devices are registered at the networked system.

3. The computer readable medium of claim 1, wherein each one of the plurality of devices includes a haptic actuator.

4. The computer readable medium of claim 1, wherein the relative location of the second device with respect to the user is determined based on the information received from the first device and information at the networked system about the second device.

5. The computer readable medium of claim 1, wherein the second device is selected from the plurality of devices further based on a haptic capability of the second device, a severity of the notification, and a fidelity of the second device.

6. The computer readable medium of claim 1, wherein the haptic effect is determined based on characteristics of the notification and characteristics of the second device.

7. The computer readable medium of claim 6, wherein the characteristics of the notification include a context of the notification or a severity of the notification.

8. The computer readable medium of claim 6, wherein the characteristics of the second device include a fidelity of the second device or a haptic capability of the second device.

9. The computer readable medium of claim 1, wherein the second device includes a sensor configured to detect a user interaction with the second device, wherein the second device is selected based on the user interaction.

10. The computer readable medium of claim 1, wherein the information received from the first device indicates that the user is missing an item.

11. The computer readable medium of claim 10, wherein the networked system determines that the user is missing an item based on information received from devices registered at the networked system.

12. The computer readable medium of claim 11, wherein the networked system determines that the user is missing an item by comparing the information received from the devices with a list of items that the user needs to have, wherein the list is based on a location of the user.

13. A method of providing haptic functionality over a networked system, the method comprising:

receiving information from a first device registered at the networked system;

determining a notification to be provided to a user based on the information;

selecting a second device registered at the networked system, wherein the second device is selected from a plurality of devices based on a relative location of the second device with respect to the user; and providing the notification to the user by producing a haptic effect on the second device.

14. The method of claim 13, wherein the plurality of devices are registered at the networked system.

15. The method of claim 13, wherein each one of the plurality of devices includes a haptic actuator.

16. The method of claim 13, wherein the relative location of the second device with respect to the user is determined based on the information received from the first device and information at the networked system about the second device.

17. The method of claim 13, wherein the second device is selected from the plurality of devices further based on a haptic capability of the second device, a severity of the notification, and a fidelity of the second device.

18. The method of claim 13, wherein the haptic effect is determined based on characteristics of the notification and characteristics of the second device.

19. The method of claim 18, wherein the characteristics of the notification include a context of the notification or a severity of the notification.

20. A system for providing haptic functionality over a networked system, comprising:

a receiving module that receives information from a first device registered at the networked system;

a determining module that determines a notification to be provided to a user based on the information;

a selecting module that selects a second device registered at the networked system, wherein the second device is selected from a plurality of devices based on a relative location of the second device with respect to the user; and a providing module that provides the notification to the user by producing a haptic effect on the second device.

* * * * *